US009799048B2

(12) United States Patent
Tinsman

(10) Patent No.: US 9,799,048 B2
(45) Date of Patent: Oct. 24, 2017

(54) INTELLIGENT TOOL TO SUPPORT MANUAL SCHEDULING OF ADS

(71) Applicant: IMAGINE COMMUNICATIONS CORP., Frisco, TX (US)

(72) Inventor: John Tinsman, Fallbrook, CA (US)

(73) Assignee: Imagine Communications Corp., Frisco, TX (US)

( * ) Notice: Subject to any disclaimer, the term of this patent is extended or adjusted under 35 U.S.C. 154(b) by 396 days.

(21) Appl. No.: 14/257,355

(22) Filed: Apr. 21, 2014

(65) Prior Publication Data
US 2015/0302463 A1 Oct. 22, 2015

(51) Int. Cl.
*G06Q 30/02* (2012.01)
(52) U.S. Cl.
CPC .................. *G06Q 30/0243* (2013.01)
(58) Field of Classification Search
CPC ................................................ G06Q 30/0243
USPC ....................................................... 705/14.42
See application file for complete search history.

(56) References Cited

U.S. PATENT DOCUMENTS

| 8,719,080 | B2* | 5/2014 | Ferry | G06Q 30/02 705/14.1 |
|---|---|---|---|---|
| 2007/0027760 | A1* | 2/2007 | Collins | G06Q 30/02 705/14.54 |
| 2008/0126192 | A1* | 5/2008 | Patel | G06Q 30/02 705/14.46 |

OTHER PUBLICATIONS

Cognition—From Memory to Creativity, Weisberg, Reeves, 2013, John Wiley & Sons, pp. 519-527.*

(Continued)

*Primary Examiner* — Namrata Boveja
*Assistant Examiner* — Michael Ezewoko
(74) *Attorney, Agent, or Firm* — Tarolli, Sundheim, Covell & Tummino LLP

(57) ABSTRACT

A system and method for providing options for scheduling ads is provided. In example embodiments, a list of one or more ads is presented to an operator. A selection of an ad to be placed into a schedule is received. Placement analysis is performed, using a hardware processor, to identify a plurality of placement options based on placing the ad into the schedule. The placement analysis includes determining a net difference metric value for each placement option. The net difference metric value is determined based on displacement of at least one previously scheduled ad in each placement option. The plurality of placement options are sorted according to a score derived from at least one value metric to create a result. The result is presented to the operator, whereby the result includes the score derived from the at least one value metric for each placement option.

20 Claims, 9 Drawing Sheets

(56) References Cited

OTHER PUBLICATIONS

Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Explaining Creativity, Keith Sawyer, 2006, Oxford University Press, pp. 104-105.*
The Way We Think, Fauconnier, 2010, Persues Books Group, Chapter 1, Chapter 13.*

* cited by examiner

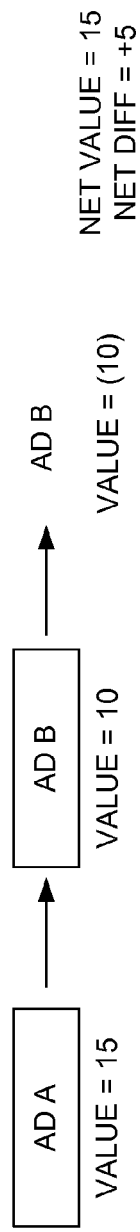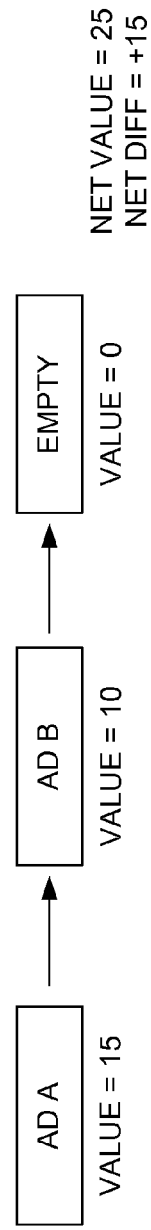

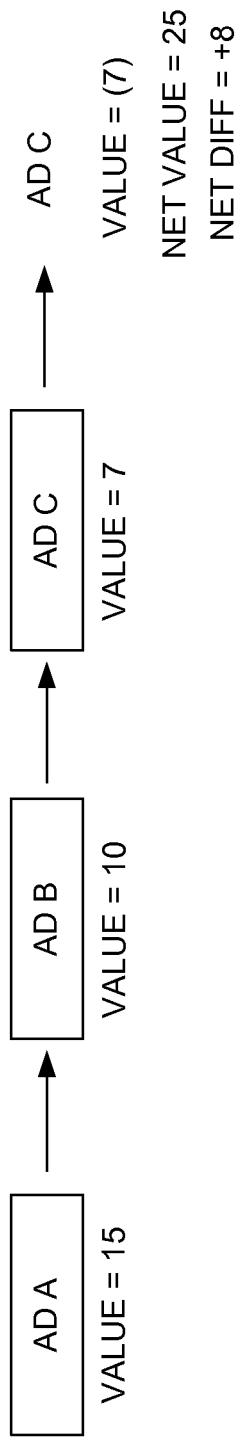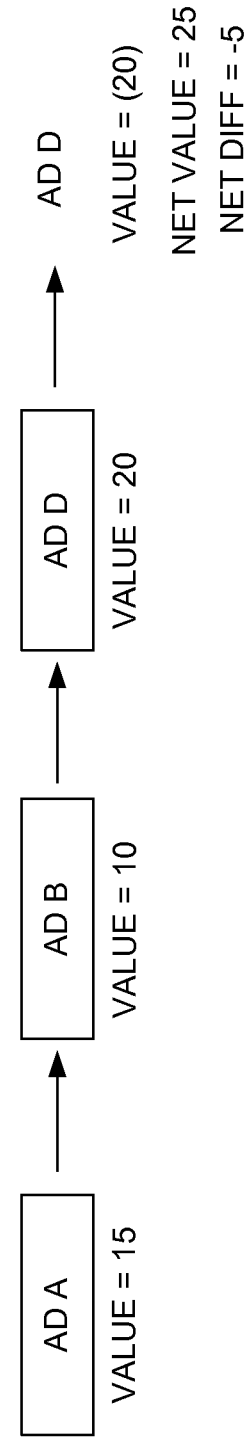

INTELLIGENT TOOL TO SUPPORT MANUAL SCHEDULING OF ADS

FIELD

The present disclosure relates generally to advertisement (ad) placement, and in a specific example embodiment, to providing support and options for scheduling of ads.

BACKGROUND

Conventionally, automatic schedulers are used for scheduling ads. However, human operators frequently need to manually schedule some subset of ads that cannot otherwise be placed into the schedule. The operator may be presented with a list of unplaced ads and a current schedule view that allows the operators to see what is currently placed. The operator must then manually place the unplaced ads taking into consideration business conditions of the unplaced ad, each schedule position (also referred to as a "slot"), and any ad that needs to be moved. All of this presents a high task load to the operator, who must keep track of various potential alternatives when deciding how to place the unplaced ad in the schedule.

BRIEF DESCRIPTION OF DRAWINGS

Various ones of the appended drawings merely illustrate example embodiments of the present invention and cannot be considered as limiting its scope.

FIGS. 1A-1I are diagrams illustrating potential ad placement options.

DETAILED DESCRIPTION

Figure 1F:
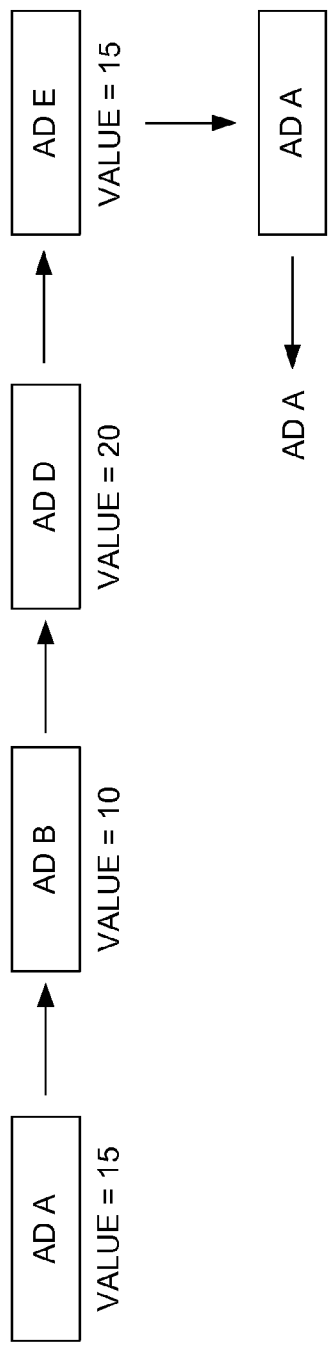

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing options for scheduling ads. In example embodiments, a list of one or more ads is presented to an operator. In one embodiment, the list may comprise one or more unplaced ads. In another embodiment, the list may comprise placed ads that may be "rescheduled." A selection of an ad to be placed into a schedule is received. Placement analysis is performed, using a hardware processor, to identify a plurality of placement options based on placing the ad into the schedule. The placement analysis includes determining a net difference metric value for each placement option. The net difference metric value is determined based on displacement of at least one previously scheduled ad in each placement option. The plurality of placement options are sorted according to a score derived from at least one value metric to create a result. The result is presented to the operator, whereby the result includes the score derived from the at least one value metric for each placement option.

FIGS. 1A-1I are diagrams illustrating potential ad placement options. In example embodiments, components of a scheduling system will analyze various ad placement options and provided a sorted list of results that may guide an operator in determining an optimal ad placement scenario. As such, the scheduling system may consider various ad placement options as depicted in FIGS. 1A-1I. Each ad has one or more corresponding value metrics. In one embodiment, the value metric may be a monetary value. For example, an ad may be worth $50,000 (e.g., placement of the ad will generate $50,000 for the network).

In another embodiment, the value metric may be a priority value. The priority value may be based on a priority of a customer and/or the priority of an order for the ad. The priority of the customer may be a value assigned to the customer by, for example, a network or ad placement agency. For example, a major, nationwide retailer may be a higher priority customer than a local dry cleaner. The priority of the order is associated with an urgency of the order. For example, if the ad must be placed into tomorrow's schedule, it may have a higher priority than an ad that may be placed anytime in the next week.

Additionally, each ad may have business conditions that limit the slots where the ad may be placed. These business conditions may include, for example, day (or range of dates) of placement, time (or time range) of placement, network(s) for placement, placement inventory type (e.g., sporting event programs, children programs), or exclusivity requirement(s). The exclusivity requirement prevents two ads that are of a similar type (e.g., product type, manufacturer type, or supplier type) from being positioned next to each other or within the same commercial break. For example, two car commercials may be prevented from being positioned next to each other in the schedule or two beer commercials may be prevented from being positioned within the same commercial break.

Referring to FIG. 1A, ad A has a value of 15. The value may represent a monetary value (e.g., $15,000) or a priority value (e.g., priority on a scale of 1-20 with 20 being the highest priority). The priority value may represent the priority for the customer associated with ad A or may represent the priority for the order. In an ideal example, an empty slot that satisfies business conditions of ad A is found. As a result, the net value would be an increase of 15.

More often than not, there is no empty slot, in which case, a "colliding ad," such as ad B, may need to be bumped (referred to as a "first step displacement"). For example, ad A with value 15 can bump ad B from the schedule and take ad B's position as illustrated in FIG. 1B. In this example, ad B has a value of 10. As such, the net value will be 15 with a net difference of +5 (ad A value of 15−ad B value of 10=net difference of +5).

With ad B bumped by ad A, it would be ideal if ad B may be moved to another slot that is empty. As with the placement of ad A, business conditions of ad B may limit where ad B may be moved. In example of FIG. 1C, an empty slot that complies with the business rules of ad B is found. As a result, the net value is then the value of ad A and ad B combined (e.g., net value=25). Thus, by placing ad A into ad B's position in the schedule and moving ad B into an empty slot, the net value difference is +15.

In the case where there is no empty slot for slot B, a further displacement of ad C may be contemplated (referred to as a "second step displacement"). Taking into consideration business rules for ad B, an ad C may be displaced. In the example of FIG. 1D, ad C is bumped and ad B takes ad C's former slot while ad A takes ad B's former slot. The result of this second step displacement is a net value of 25 with a net difference of +8. The net difference is a result of the value of placement of ad A plus ad B (e.g.,25) minus the value of the previously placement of ad B and ad C (e.g., 17).

However, not every option will result in a positive net difference. Referring to FIG. 1E, a second step displacement is contemplated whereby ad A takes ad B's slot, and ad B takes ad D's slot. However, ad D has a value of 20. Since dropping ad D from the schedule would result in a net value difference of −5, it would not make sense to implement this option. In some cases, any analysis beyond displacing ad D may not be performed since the value will not likely improve. This stopping of the analysis may help reduce processing cycles and reduce time needed to perform analysis of a plurality of options.

Another option that would not make sense to implement is the option shown in FIG. 1F. In this example, ad D displaces ad E. However, ad E then displaces ad A, the initial unplaced ad that is the subject of the analysis (referred to as a "loop"). Therefore, the option presented in FIG. 1F is not likely be implemented since the ad the operator is trying to schedule gets bumped. Thus, because the number of potential options grows quickly with the depth of the search/displacement, intelligent pruning may be applied to remove loops and sub-branches that lead to a worse outcome than leaving the ad unplaced.

Figure 1G:
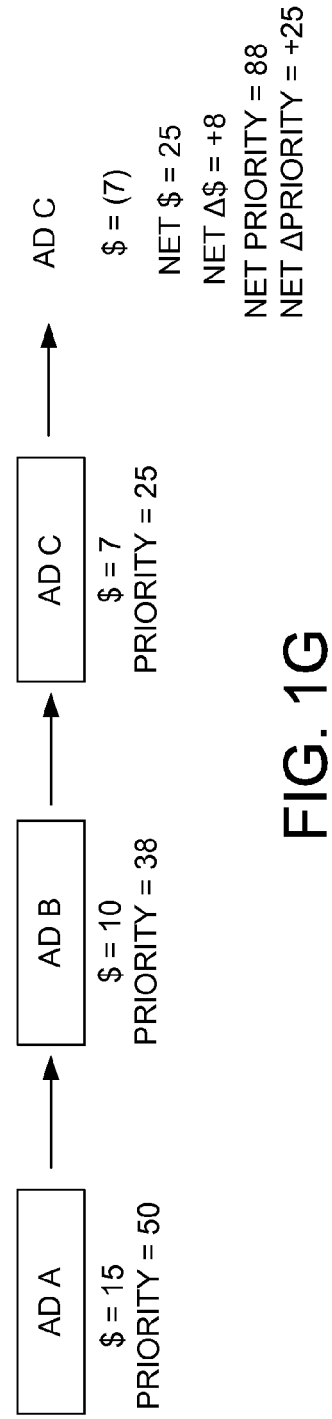

While options have been discussed using only a single value metric, example embodiments may also contemplate a plurality of value metrics when scoring and ranking options. FIG. 1G illustrates an option where two metric values are used in scoring the option. In this example, ad A has a monetary value of 15 (e.g., worth $15,000) and a priority value of 50 (e.g., value of the customer or the order). Ad A displaces ad B, which has a monetary value of 10 and a priority value of 38. Ad B then displaces ad C, which has a monetary value of 7 and a priority value of 25. Ad C gets dropped from the schedule. As a result, a net monetary value is 25 with a net difference from adding ad A and dropping ad C of +8. Additionally, a net priority value of 88 is obtained from this second step displacement with a net priority difference of +25. Therefore, the option of FIG. 1G is a viable option. However, if one or both of the value metrics has a negative net difference, the option may not be contemplated in some embodiments.

Figure 1H:
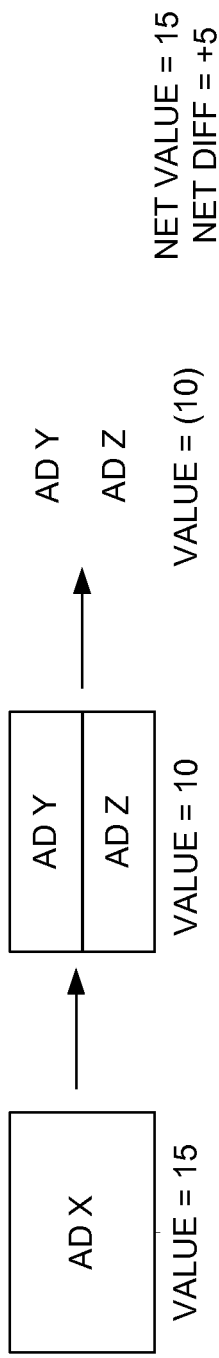

Furthermore, while options have been discussed whereby ads of a same length (e.g., 15 seconds) displace each other, example embodiments may contemplate different length ads being placed or displaced. For example, the embodiment of FIG. 1H shows an ad X which is twice the length of each of ad Y and ad Z. Therefore, in order to place ad X into the schedule two ads (e.g., ad Y and ad Z) may be bumped from the schedule (or moved to other slots in the schedule).

Figure 1I:
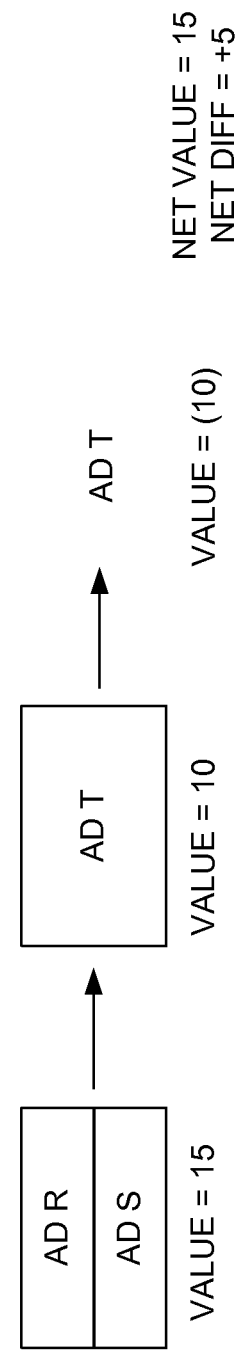

Conversely, two shorter length ads may displace a single longer length ad as shown in FIG. 1I. As an extension of FIG. 1I a set of unplaced ads may be analyzed together to determine optimal ad slots in the schedule. That is, the operator may request that a group or set of unplaced ads be analyzed, and a result comprises a list representing highest valued joint decisions that combine various options for each of the ads of the group.

Figure 2:
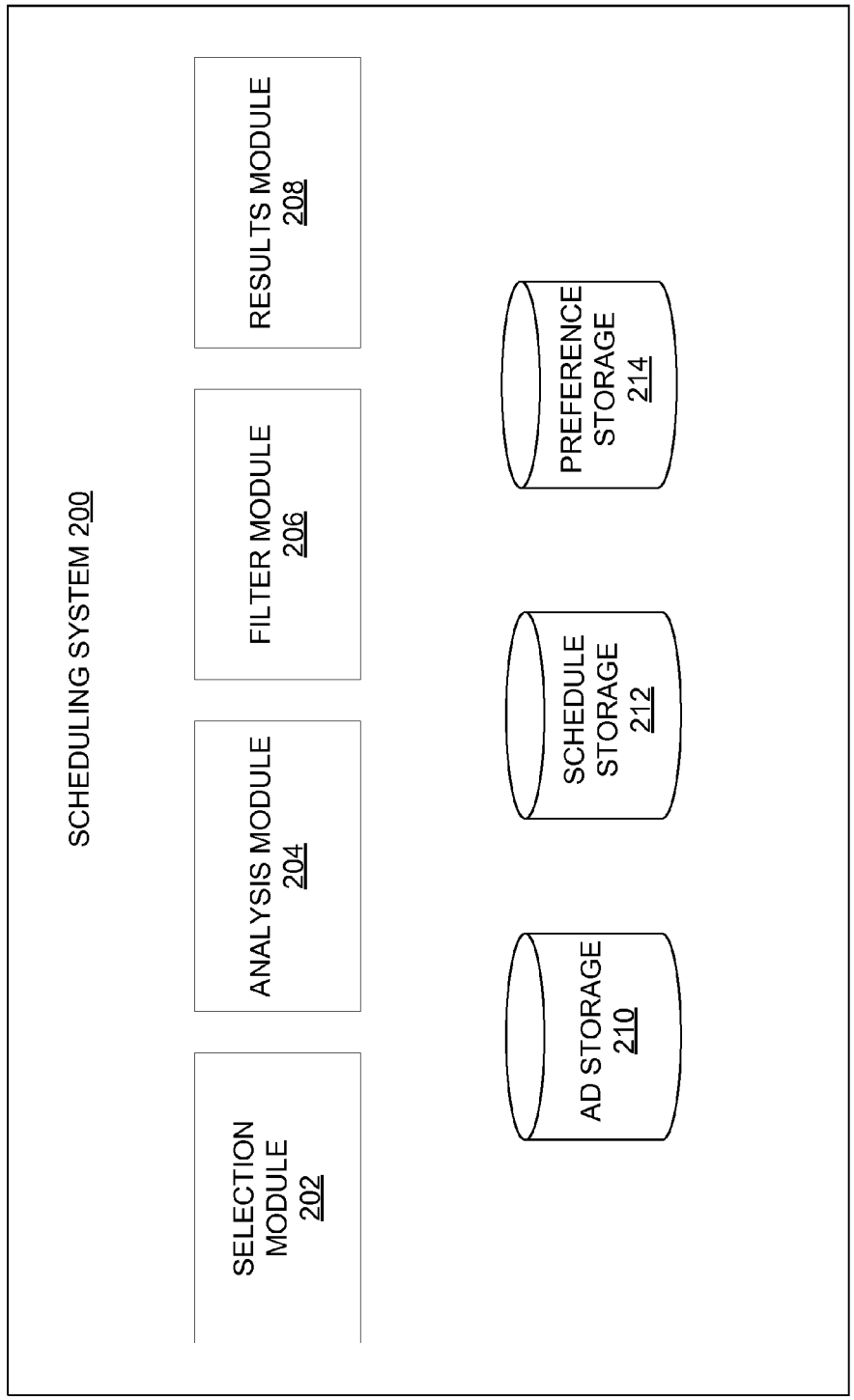
FIG. 2 is a block diagram illustrating of a scheduling system, in accordance with an example embodiment.

Referring now to FIG. 2, a block diagram illustrating an example embodiment of a scheduling system 200 is provided. The scheduling system 200 may be embodied within one or more servers. In example embodiments, the scheduling system 200 comprises a tool that can quickly and efficiently determine a list of optimal ad slot placements. The list of optimal ad slot placements may be presented to an operator for selection or approval in accordance with some embodiments. In other embodiments, the scheduling system 200 may automatically implement a most optimal option (e.g., schedule ads). As such, the scheduling system 200 may comprise a selection module 202, an analysis module 204, a filter module 206, a results module 208, an ad storage 210, a schedule storage 212, and a preference storage 214.

The selection module 202 manages an unplaced ad selection process. In example embodiments, the selection module 202 may access the ad storage 210 and obtain a list of unplaced ads. In some embodiments, the selection module 202 may sort the list of unplaced ads based on one or more value metrics in order to allow the operator to start with the "most important" unplaced ads. For example, the list may be sorted such that a highest monetary value unplaced ad is listed first or such that a highest priority unplaced ad is listed first. Alternatively, the list may be sorted based on a weighted combination of different value metrics (e.g., 50% monetary value and 50% priority value). In one embodiment, the method for sorting the list of unplaced ad may be indicated by an operator or be a preference previously indicated and stored in the preference storage 214.

The sorted list may then be presented to the operator. The operator may then make a selection of one or more unplaced ads with which to perform a placement analysis. The operator may also select or indicate the value metric(s) to be used in performing the analysis. For example, the operator may indicate that the analysis should be performed using only a monetary value metric, only a customer priority value metric, only an order priority value metric, or any combination of these value metrics. With the combination of value metrics, a weight may be provided (e.g. 40% monetary value metric, 30% customer priority value metric, and 30% order priority value metric). The selections of the unplaced ad(s) and value metric is received by the selection module 202 and provided to the analysis module 204. It is noted that in some embodiments, the value metric and weight to be applied to a combination value metric analysis may be a preference stored in the preference storage 214. Thus, the selection module or analysis module 204 may obtain that information from the preference storage 214.

The analysis module 204 performs the placement analysis for the selected one or more unplaced ads. In example embodiments, the analysis module 204 may determine any business conditions for the selected unplaced ad. The business conditions may be stored with the ad in the ad storage 210 and retrieved by the analysis module 204. Additionally, the analysis module 204 determines any filter preferences to be applied to the analysis. For example, the operator may only want to see the top 50 optimal placement options. In another example, any placement options that result in negative difference values should be dropped or not considered. These filter preferences may be received from the operator or retrieved from the preference storage 214. Further still, the analysis module 204 accesses a current schedule from the schedule storage 212. The current schedule may have previously placed ads, and in some cases, empty slots that are available for ad placement.

Using all of the received or retrieved information, the analysis module 202 performs an analysis using the selected unplaced ad(s) to determine one or more placement options. In one embodiment, the analysis module 202 may first look at empty slots and may, in some cases, stop analysis if one or more empty slots are discovered where the selected unplaced ad(s) may be placed. In other embodiments, the analysis module 202 may continue performing analysis using a first step displacement (e.g., as discussed in the examples of FIGS. 1B and 1C). A second or further step displacement analysis may also be performed depending on the filter preferences. For example, if the operator wants a minimum of 30 viable placement options (e.g., positive net difference metric value options), the analysis module 204 may need to perform a second step displacement analysis if a first step displacement analysis does not present enough options.

In an alternative embodiment, the operator may indicate where the selected unplaced ad should be placed in the schedule. For example, the operator may know that a high priority customer wants their ad placed in the last commercial break of the season finale of a particular show. As such, the operator may select the unplaced ad for this customer and select the slot where the ad should go even though an ad may already be in that slot. The selection module 202 receives the selection of the unplaced ad and the slot where the ad should go and provides the information to the analysis module 204. The analysis module 204 may then perform an analysis using the ad that was displaced by the selected ad.

The filter module 206 filters and sorts the different placement options identified by the analysis module 204. For example, the filter module 206 may remove any negative net difference value metric options. Additionally, the filter module 206 may sort the remaining placement options from a highest net difference metric value to a lowest net difference metric value.

The results may then be presented by the results module 208 showing a net impact of forcing the unplaced ad into the schedule at each possible slot taking into account options for moving a "colliding ad" into an alternative slot. In some embodiments, the results may be presented in a grid format user interface that shows placement on the schedule and includes value metrics or net difference value metrics. In other embodiment, the results may be provided in a list format that includes the value metrics or the net difference value metrics on a user interface. Alternatively, other methods for displaying the results may be used which allows the operator to avoid having to track individual decision trees. Instead, the operator may focus on a compact list of specific options. Further still, the results may present more than the net difference value metrics, such as other metadata about an ad being displaced or dropped from the schedule as a result of selecting that option.

In some embodiments, the storage 210-214 may be combined into a single storage or other combination of storage. It is noted that other components not necessary to describe example embodiments may also be included in the scheduling system 200 (e.g., processors). Additionally while the ad storage 210, the schedule storage 212, and the preference storage 214. are shown to be a part of the scheduling system 200, in alternative embodiments, one or more of these storage 210-214 may be located elsewhere. For example, the schedule storage 212 may be located in a "cloud" or be at a broadcast network location.

Figure 3:
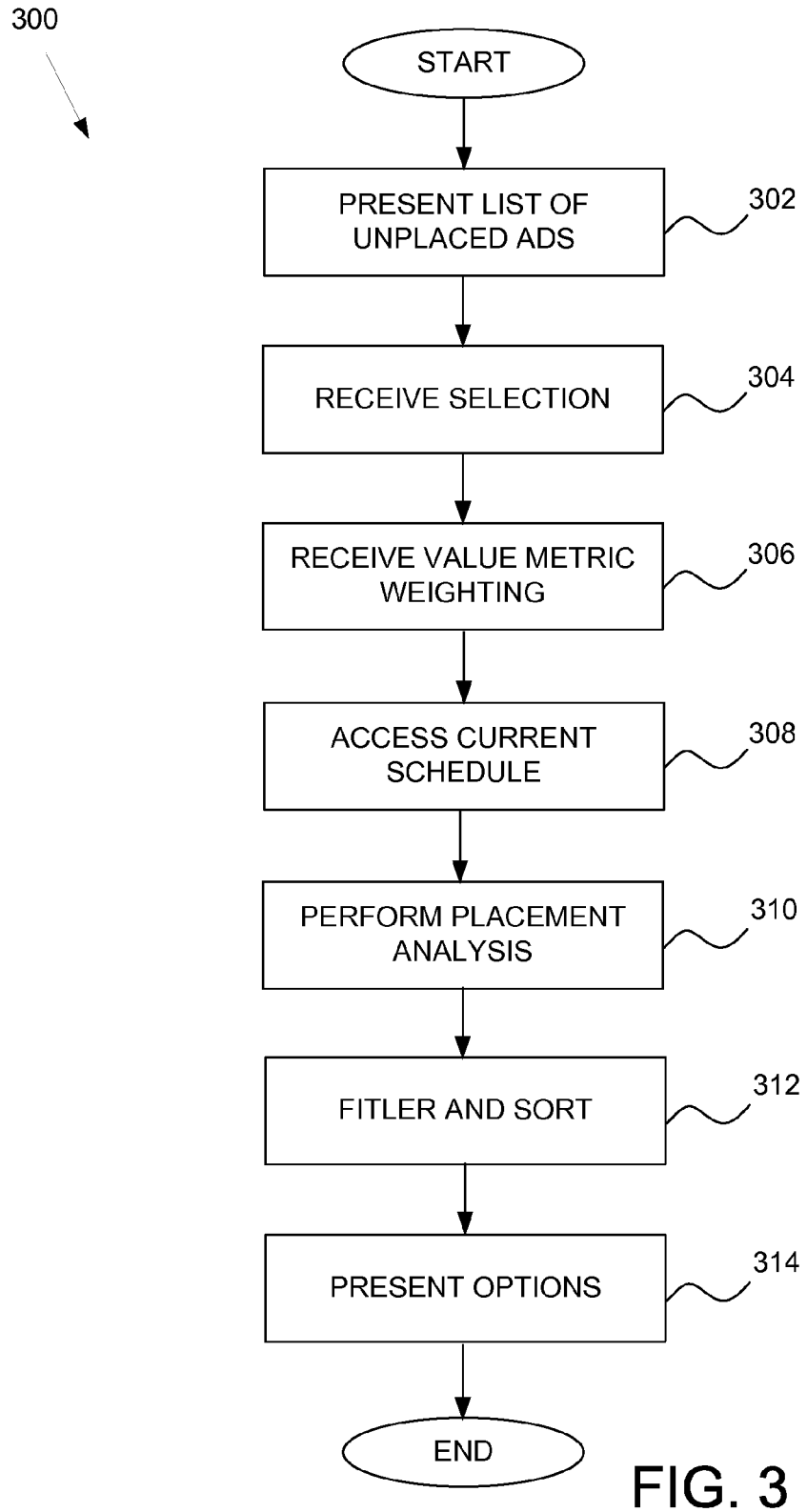
FIG. 3 is a flow diagram of a method, in accordance with an example embodiment, for providing ad scheduling options.

Referring now to FIG. 3, a flow diagram of an example method 300 for providing ad scheduling options is shown. The operations of the method 300 may be performed by components of the scheduling system 200. In operation 302, a list of unplaced ads is presented to an operator by the selection module 202. Accordingly, the selection module 202 may access the ad storage 210 and obtain a list of unplaced ads. The selection module 202 may sort the list of unplaced ads based on one or more value metrics (e.g., monetary value, priority value). In one embodiment, the method for sorting the list of unplaced ad may be indicated by an operator or be a preference previously indicated and stored in the preference storage 214. In a further embodiment, the list of unplaced ads may be provided to a device of the operator and presented on a display of the device. While the present method 300 is discussed with respect to unplaced ads, alternative embodiments may contemplate placed ads which may be rescheduled.

In operation 304, a selection of one or more unplaced ads is received. In example embodiments, the operator may select the one or more unplaced ads from the list that is presented. Alternatively, the operator may select the unplaced ad and also indicate where the unplaced ad should be placed in the schedule, which may displace a previously scheduled ad. As a result, the displaced previously scheduled ad becomes the selected ad for placement analysis. This alternative embodiment, thus, allows the operator to see what will happen if the operator forces the unplaced ad into the slot currently occupied by the previously scheduled ad.

Value metric weighting may be received in operation 306. The value metric weighting indicates how the analysis should be performed by the analysis module 204. The value metric weighting may indicate an analysis using only a monetary value metric, only a customer priority value metric, only an order priority value metric, or any combination of these value metrics based on a weighting (e.g., 50% monetary value metric, 50% customer priority value metric). In some embodiments, the value metric weighting (e.g., value metric and weight to be applied) may be a preference stored in the preference storage 214 that is retrieved. In some embodiments, the selection and value metric may be received at the same time (e.g., a same communication from a device of the operator) or may be optional.

In operation 308, a current schedule is accessed by the analysis module 202. The current schedule may have previously placed ads, and in some cases, empty slots that are available for ad placement.

In operation 310, a placement analysis to identify placement options is performed. The placement analysis will be discussed in more detail in connection with FIGS. 4A and 4B below.

The results from the placement analysis may be filtered and sorted in operation 312. In example embodiments, the filter module 206 filters and sorts the different placement options identified by the analysis module 204. For example, the filter module 206 may remove any negative net difference value metric options. Additionally, the filter module 206 may sort the remaining placement options using derived scores based on the metric values (or net differences in the metric values). For example, the filter module 206 may sort from a highest net difference metric value to a lowest net difference metric value. While the embodiment shown in FIG. 3 shows the filter occurring after the placement analysis, alternative embodiments may contemplate filtering while the placement analysis is occurring. Thus, for example, negative net metric value placement options may be removed as the analysis module 204 determines the difference value.

The placement options are presented in operation 314. In some embodiments, the results may be presented in a grid format user interface that shows placement on the schedule. In another embodiment, the results may be provided in a list format that includes scores based on the value metrics along with net difference value metrics on a user interface. In some cases, the scores may be a composite score (e.g., net difference in monetary value and net different in priority value).

Further still, the results may be provided to a device of the user where a user interface is presented to the operator that shows a grid, list, or other format of placement options. The operator may then review the results and determine which placement option should be used. In some cases, the highest positive net difference metric value may not be the placement option selected by the operator. For example, a relationship with a customer may override a high monetary net gain. It is noted that the results may comprise sorted options with any number of displacements (e.g. first step displacement, second step displacement, etc.).

Figure 4A:
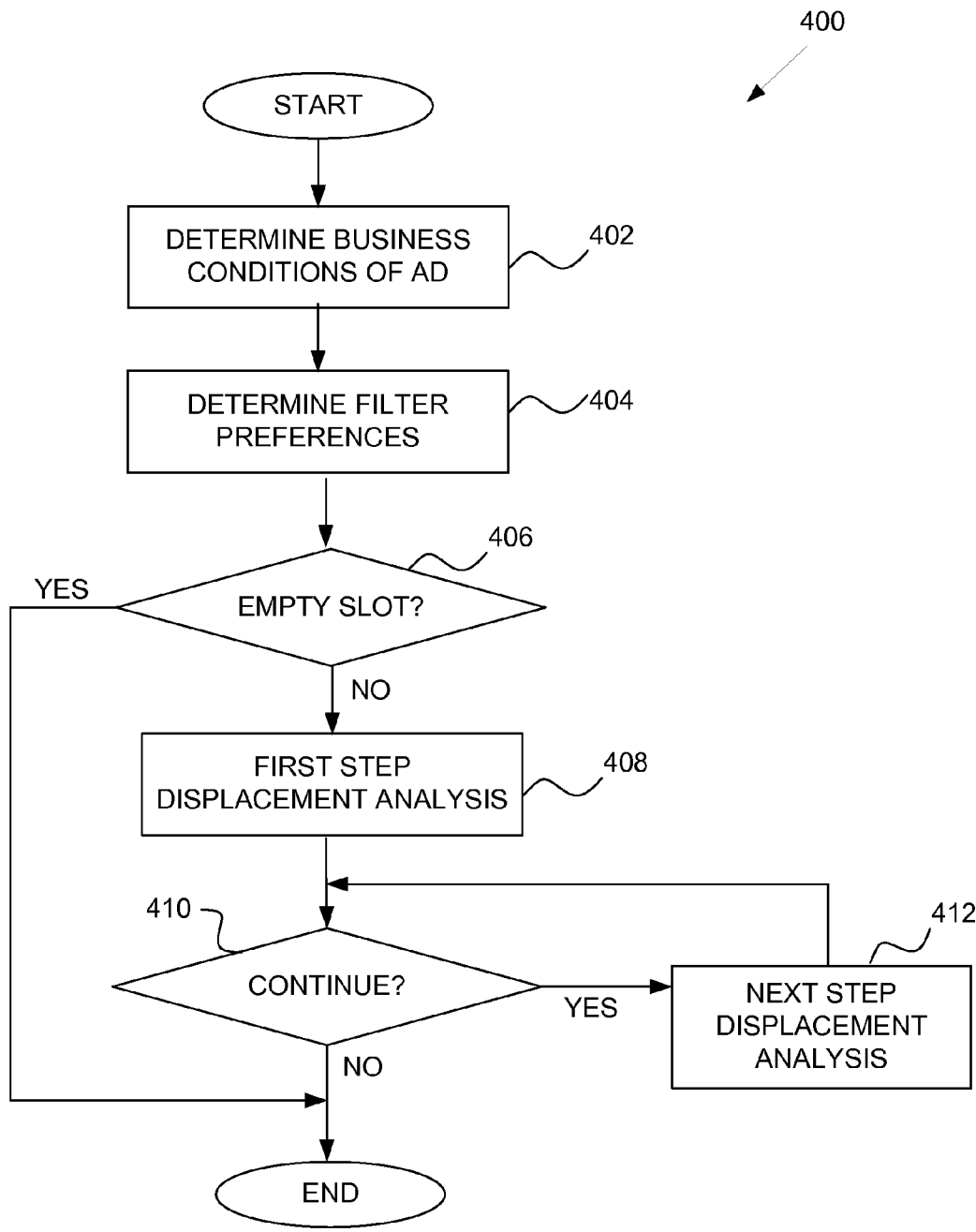
FIG. 4A is a flow diagram of a method, in accordance with an example embodiment, for analyzing placement in a schedule.

FIG. 4A is a flow diagram of an example method for performing placement analysis (operation 310) to identify placement options. The operations of the method 400 may be performed by the analysis module 204 of the scheduling system 200.

In operation 402, one or more business conditions for the selected unplaced ad are determined. The business conditions may be stored with the ad in the ad storage 210 and retrieved by the analysis module 204. The business conditions may include, for example, day (or range of dates) of placement, time (or time range) of placement, network(s) for placement, placement inventory type (e.g., sporting event programs), or exclusivity requirement(s). The exclusivity requirement prevents two ads that are of a similar type from being positioned next to each other or within the same commercial break.

In operation 404, one or more filter preferences for the placement analysis are determined. The analysis module 204 may determine any filter preferences to be applied to the analysis. For example, the operator may only want to see the top 50 optimal placement options. In another example, any placement options that result in negative difference values should be dropped or not considered. These filter preferences may be received from the operator or retrieved from the preference storage 214.

In operation 406, a determination is made whether an empty slot is available in the schedule for the unplaced ad that satisfies the business conditions of the unplaced ad. If an empty slot is available that satisfies the business conditions, the analysis may end since this may be the most optimal option. Alternatively, the analysis module 204 may continue looking for other empty slots or perform a first step displacement analys is in operation 408.

If no empty slots in the schedule are identified that satisfy the business conditions of the unplaced ad (or even if they are found but a minimum number of options has not been identified according to the filter preferences), then a first step displacement analysis may be performed in operation 408. In the first step displacement analysis, the analysis module 204 attempts to place the unplaced ad into slots in the schedule currently occupied by other ads. With each attempt, the analysis module 204 may determine one or more net values or net difference metric values that result from replacing a current ad with the unplaced ad.

In operation 410, a determination may be made as to whether the analysis should continue. For example, if a threshold number of placement options have been identified, the analysis module 204 may stop any further analysis. If analysis is to continue, then in operation 412, a next step displacement analysis may be performed. In this case, a second step displacement analysis is performed whereby the unplaced ad displaces a first ad which then displaces a second ad. The process may continue until the analysis module 204 determines that no further analysis is needed.

Figure 4B:
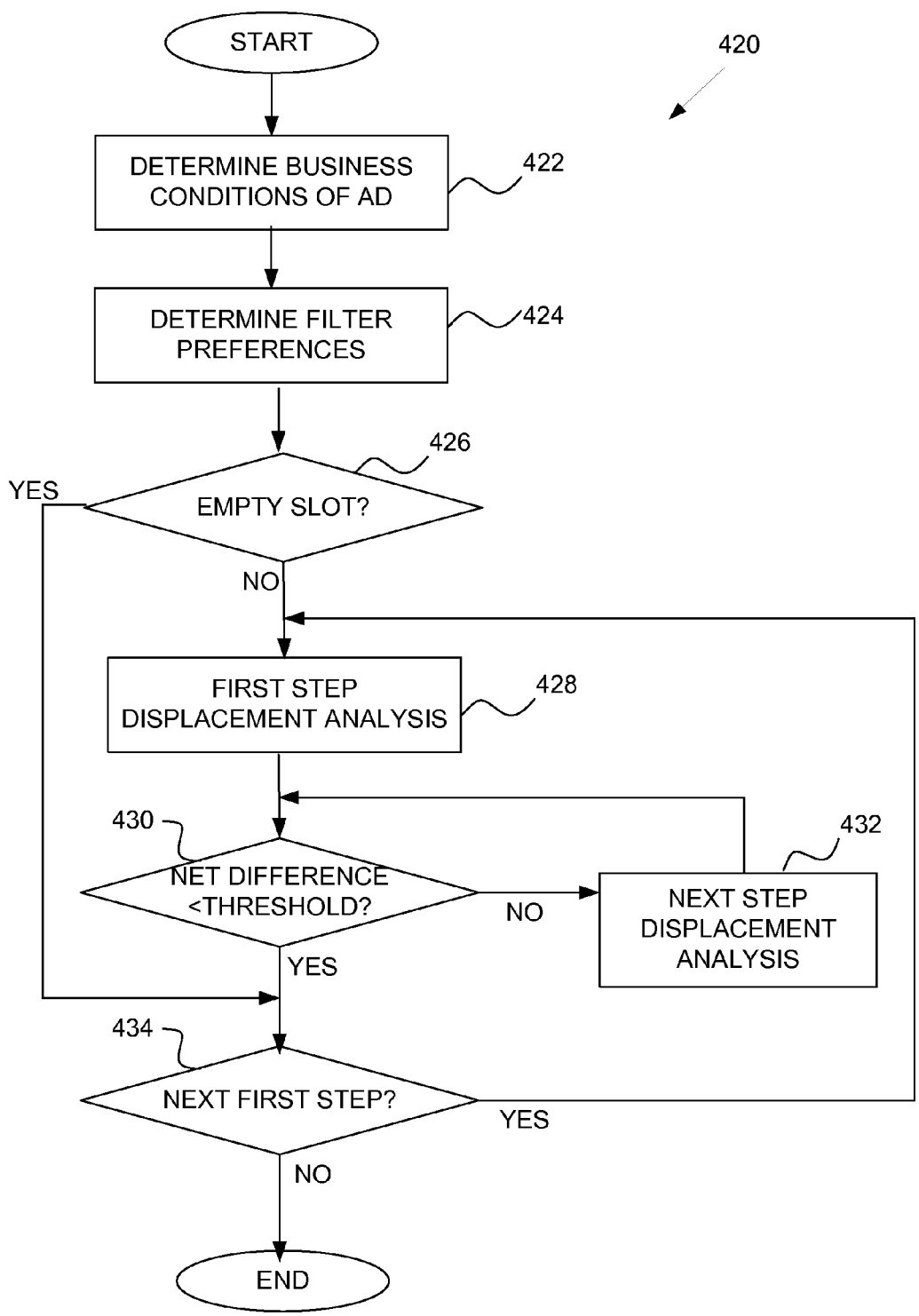
FIG. 4B is a flow diagram of an alternative method, in accordance with an example embodiment, for analyzing placement in a schedule.

FIG. 4B is a flow diagram of an alternative example method for performing placement analysis (operation 310) to identify placement options. The operations of the method 420 may be performed by the analysis module 204 of the scheduling system 200.

In operation 422, one or more business conditions for the selected unplaced ad are determined. In example embodiments, the analysis module 204 may determine any business conditions for the selected unplaced ad (e.g., retrieved from the ad storage 210). The business conditions may include, for example, day (or range of dates) of placement, time (or time range) of placement, network(s) for placement, placement inventory type (e.g., sporting event programs), or exclusivity requirement(s).

In operation 424, one or more filter preferences for the placement analysis are determined. The analysis module 204 may determine any filter preferences to be applied to the analysis by receiving the filter preferences from the operator or retrieving the filter preferences from the preference storage 214.

In operation 426, a determination is made whether an empty slot is available in the schedule for the unplaced ad that satisfies any business conditions of the unplaced ad. If an empty slot is available that satisfies the business conditions, the analysis may end since this may be the most optimal option. Alternatively, the analysis module 204 may continue looking for other empty slots or perform a first step displacement analysis in operation 408.

If no empty slots in the schedule are identified that satisfy the business conditions of the unplaced ad (or even if they are found but a minimum number of options has not been reached according to the filter preference), then a first step displacement analysis may be performed in operation 428. In the first step displacement analysis, the analysis module 204 attempts to place the unplaced ad into a slot in the schedule currently occupied by another ad. The analysis module 204 may determine one or more net values or net difference metric values that result from replacing a current ad with the unplaced ad.

In operation 430, a determination may be made as to whether the net difference metric value obtained in operation 428 is less than a predetermined threshold (e.g., is low or negative). For example, if a low or negative net difference metric value is obtained, then the placement analysis may be stopped. If it is unlikely that a next step displacement will result in an enough of a possible gain as to recover from the low or negative net difference obtained in the first step displacement, there is likely no need to continue. The method 420 then proceeds to operation 434 to determine whether there is a next first step analysis to be performed.

However, if the net difference metric value is above the predetermined threshold (e.g., not negative or low), the analysis module 204 may perform a second step displacement analysis by displacing a second ad with the first displaced ad in operation 432. It is noted that operation 432 may be repeated for each instance of a second ad that may be displaced by the first ad. The analysis module 204 also determines one or more net values or net difference metric values that result from replacing the second ad with the first ad. The method 420 returns to operation 430 to determine whether a net difference metric value obtained in operation(s) 432 is below the predetermined threshold. If the net difference metric value is below the predetermined threshold, then the placement analysis may be stopped for that particular second step displacement, but may continue with other second step displacements that resulted in a positive net difference. For example, ad A displacing ad B displacing ad D may result in a negative net difference metric value (e.g., see FIG. 1E), but ad A displacing ad B displacing ad C may result in a positive net difference metric value. As such, the options of ad A→ad B→ad C may continue with a next step displacement analysis (e.g., a third step displacement analysis).

Once a filter preference threshold is reached (e.g., maximum number of placement options) or no further positive net difference metric values are obtained, the method 420 may continue with a next first step displacement analysis. For example, the analysis module 204 may look at options involving ad A displacing ad G and any subsequent step displacements. While the embodiments of FIGS. 4A and 4B were discussed separately, alternative embodiments may combine operations of the two embodiments.

Example embodiments have been discussed with respect to ad placement in a broadcasting schedule environment. However, it is noted that embodiments may be practiced in other environments that use a position based ad system. For example, a similar system may be used to place ads on billboards or in magazines. Additionally, while the methods are discussed with respect to unplaced ads, alternative embodiments may contemplate placed ads which may be rescheduled.

Figure 5:
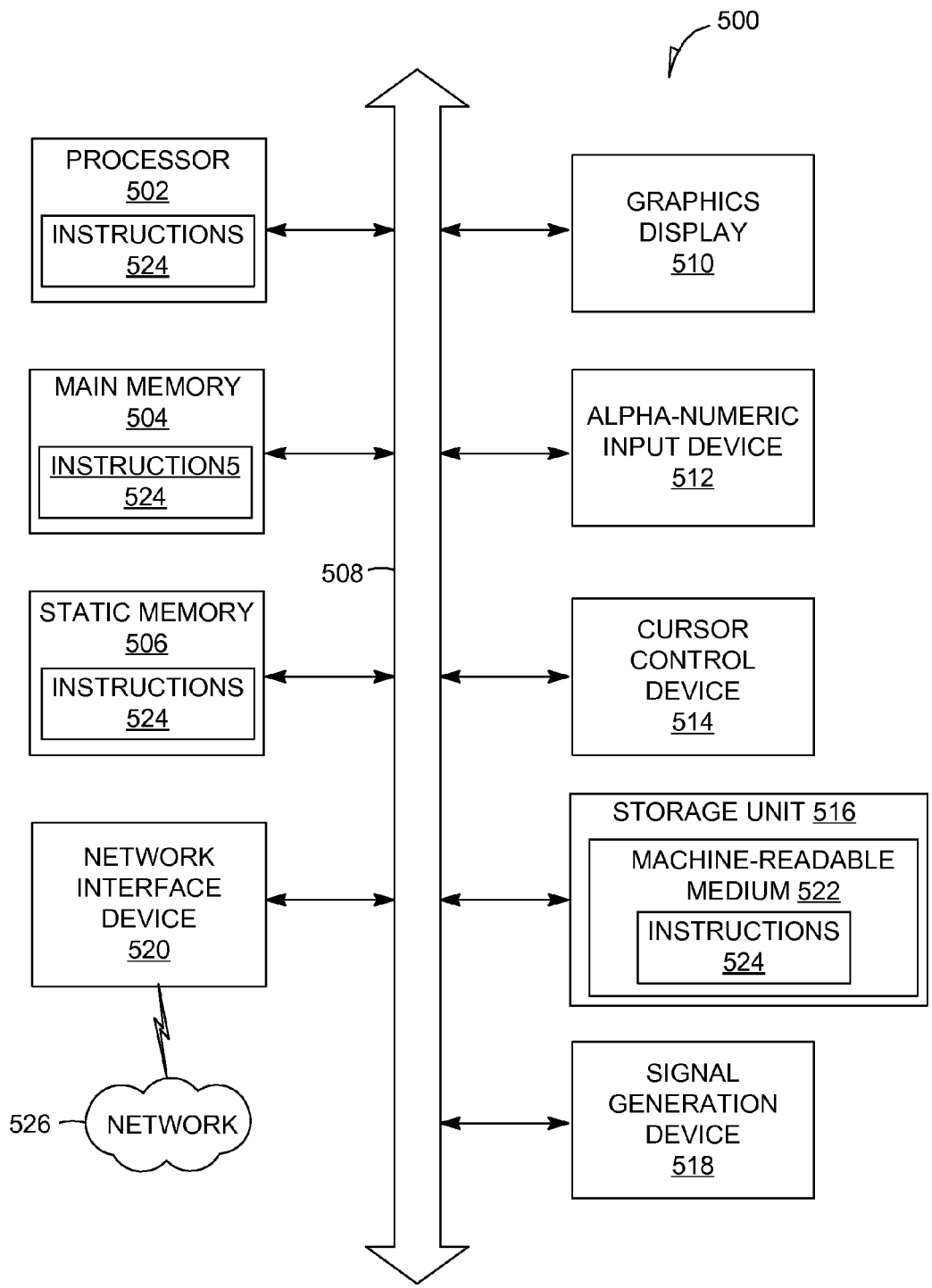
FIG. 5 is a simplified block diagram of a machine in an example form of a computing system within which a set of instructions for causing the machine to perform any one or more of the methodologies discussed herein may be executed.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system and within which instructions 524 (e.g., software, a program, an application, an applet, an app, or other executable code) for causing the machine 500 to perform any one or more of the methodologies discussed herein may be executed. In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a graphics display 510 (e.g., a plasma display panel (PDP), a light emitting diode (LED) display, a liquid crystal display (LCD), a projector, or a cathode ray tube (CRT)). The machine 500 may also include an alpha-numeric input device 512 (e.g., a keyboard), a cursor control device 514 (e.g., a mouse, a touchpad, a trackball, a joystick, a motion sensor, remote control device, or other pointing instrument), a storage unit 516, a signal generation device 518 (e.g., a speaker), and a network interface device 520.

The storage unit 516 includes a machine-readable medium 522 on which is stored the instructions 524 embodying any one or more of the methodologies or functions described herein. The instructions 524 may also reside, completely or at least partially, within the main memory 504, within the processor 502 (e.g., within the processor's cache memory), or both, during execution thereof by the machine 500. Accordingly, the main memory 504 and the processor 502 may be considered as machine-readable media. The instructions 524 may be transmitted or received over a network 526 via the network interface device 520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 500), such that the instructions (e.g., instructions 524), when executed by one or more processors of the machine (e.g., processor 502), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 524 may further be transmitted or received over a communications network 526 using a transmission medium via the network interface device 520 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method of manually placing advertisements into a schedule comprising:
    causing presentation of a list of one or more ads to an operator;
    receiving, via a computer input device, a manual operator selection of an ad from the list, the ad to be placed into the schedule;
    based on the selection, performing placement analysis, using a hardware processor, the placement analysis comprising:
        determining business conditions associated with the selected ad limiting the slots where the selected ad may be placed, the business conditions including at least one of day or range of dates of placement, time or time range of placement, networks for placement, placement inventory type, or an exclusivity requirement preventing two ads of a similar product type, manufacturer type, or supplier type from being positioned in proximity to each other;
        determining filter preferences for the analysis, the filter preferences modifiable by the operator, the filter preferences specifying at least a minimum number of viable placement options each having a positive net difference metric value;
        accessing a current schedule;
        determining an absence of an empty slot in the current schedule that would satisfy the business conditions;
        based on the absence, performing a first step displacement analysis comprising identifying a plurality of first step placement options for placing the selected ad into the current schedule for displacement in each option of at least one previously scheduled ad based on the selected ad, the business conditions, the filter preferences, and the current schedule, each placement option resulting in a modified schedule, each ad in the modified schedule having a metric value associated with its position in the schedule, the modified schedule having a net metric value equal to the sum of the metric values of all ads in the modified schedule, and determining a net difference metric value for each identified placement option as a difference between the net metric value for the modified schedule and the net metric value for the current schedule, each net difference metric value determined based on the displacement of the at least one previously scheduled ad in each identified placement option;
        for each placement option having a net difference metric value greater than a predetermined threshold, performing a next step displacement analysis comprising identifying a plurality of next step placement options for placing the displaced ad into the modified schedule based on the displaced ad, business conditions associated with the displaced ad, the filter preferences, and the modified schedule, each next step placement option resulting in a newly modified schedule having a net difference metric value that is a difference between the net metric value for the newly modified schedule and the net metric value for the modified schedule, the newly modified schedule's net difference metric value determined based on displacement of at least one other previously scheduled ad; and
        repeating the next step displacement analysis, each time displacing ads other than the operator-selected ad, until the filter preference minimum number of viable placement options is reached or until no further placement options having a net difference metric value greater than the predetermined threshold are obtained;
    sorting the plurality of placement options according to a score derived from the determined net difference metric values to create a result;
    causing presentation of the result to the operator on a display, the result including the score for each placement option.

2. The method of claim 1, further comprising:
    receiving an operator determination of which placement option in the presented result should be used; and
    repeating the method for a plurality of advertisements.

3. The method of claim 1, wherein the manual operator selection further includes selecting a second ad for placement into the schedule, and the at least one previously scheduled ad displaced in the determination of the net difference metric value during the placement analysis for each placement option is the combined length of the two ads selected for placement.

4. The method of claim 1, further comprising filtering the plurality of placement options to remove any placement options that have a negative net difference value metric.

5. The method of claim 1, further comprising filtering the plurality of placement options to remove any placement options that result in a loop.

6. The method of claim 1, wherein the metric value associated with each ad's schedule position is based on a weighted combination of value metrics including at least a monetary value metric indicative of revenue that will be generated by the placement of the ad.

7. The method of claim 1, wherein the metric value associated with each ad's schedule position is based on a weighted combination of value metrics including at least a customer priority value metric indicative of the relative priority of the customer providing the ad as against other customers providing other ads in the schedule.

8. The method of claim 1, wherein the metric value associated with each ad's schedule position is based on a weighted combination of value metrics including at least an ad order priority value metric indicative of the relative priority of the timeliness of presentation of the ad as against the timeliness of presentation of other ads in the schedule.

9. The method of claim 1, wherein the metric value associated with each ad's schedule position is based on solely on a monetary value metric indicative of revenue that will be generated by the placement of the ad.

10. The method of claim 1, wherein the receiving the selection of the ad from the list comprises receiving the selection of the ad and a slot where the ad is to be placed, and wherein the performing placement analysis comprises identifying a plurality of placement options for placing a displaced ad that is displaced by placement of the ad in the slot previously occupied by the displaced ad.

11. The method of claim 1, wherein the score comprises a composite score indicating a net difference for at least two value metrics selected from the group comprising a monetary value metric, a customer priority value metric, and an ad order priority value metric.

12. The method of claim 1, further comprising sorting the list of one or more ads prior to the causing presentation of the list based on the at least one value metric.

13. A system comprising:
a hardware processor;
a selection module to cause presentation on a display of a list of one or more ads to an operator and to receive a selection of an ad from the list, the ad to be manually placed into a schedule via a computer input device;
an analysis module to perform placement analysis, using the hardware processor, the placement analysis comprising:
determining business conditions associated with the selected ad limiting the slots where the selected ad may be placed, the business conditions including at least one of day or range of dates of placement, time or time range of placement, networks for placement, placement inventory type, or an exclusivity requirement preventing two ads of a similar product type, manufacturer type, or supplier type from being positioned in proximity to each other;
determining filter preferences for the analysis, the filter preferences modifiable by the operator, the filter preferences specifying at least a minimum number of viable placement options each having a positive net difference metric value;
accessing a current schedule;
determining an absence of an empty slot in the current schedule that would satisfy the business conditions;
based on the absence, performing a first step displacement analysis comprising identifying a plurality of first step placement options for placing the selected ad into the current schedule based on the selected ad, the business conditions, the filter preferences, and the current schedule, each placement option resulting in a modified schedule, each ad in the modified schedule having a metric value associated with its position in the schedule, the modified schedule having a net metric value equal to the sum of the metric values of all ads in the modified schedule, and determining a net difference metric value for each identified placement option as a difference between the net metric value for the modified schedule and the net metric value for the current schedule, each net difference metric value determined based on displacement of at least one previously scheduled ad in each identified placement option;
for each placement option having a net difference metric value greater than a predetermined threshold, performing a next step displacement analysis comprising identifying a plurality of next step placement options for placing the displaced ad into the modified schedule based on the displaced ad, business conditions associated with the displaced ad, the filter preferences, and the modified schedule, each next step placement option resulting in a newly modified schedule having a net difference metric value that is a difference between the net metric value for the newly modified schedule and the net metric value for the modified schedule, the newly modified schedule's net difference metric value determined based on displacement of at least one other previously scheduled ad; and
repeating the next step displacement analysis, each time displacing ads other than the operator-selected ad, until the filter preference minimum number of viable placement options is reached or until no further placement options having a net difference metric value greater than the predetermined threshold are obtained;
a filter module to sort the plurality of placement options according to a score derived from the determined net difference metric values to create a result; and
a results module to cause presentation of the result to the operator, the result including the score for each placement option, and to receive an operator determination of which placement option in the presented result should be used,
such that the system facilitates repeating, for a plurality of advertisements, the presentation, the operator ad selection, the placement analysis, the sorting, the presentation of results, and the operator determination of placement option to be used.

14. The system of claim 13, wherein the filter module is further to filter the plurality of placement options to remove any placement options that have a negative net difference value metric.

15. The system of claim 13, wherein the metric value associated with each ad's schedule position is selected from one of, or comprises a weighted combination of, a monetary value metric indicative of revenue that will be generated by the placement of the ad, a customer priority value metric indicative of the relative priority of the customer providing the ad as against other customers providing other ads in the schedule, and an ad order priority value metric indicative of the relative priority of the timeliness of presentation of the ad as against the timeliness of presentation of other ads in the schedule.

16. The system of claim 13, wherein the selection module is to receive the selection of the ad along with a slot where the ad is to be placed, and wherein the analysis module is to perform placement analysis by identifying a plurality of placement options for placing a displaced ad that is displaced by placement of the ad in the slot previously occupied by the displaced ad.

17. A non-transitory machine-readable storage medium storing instructions which, when executed by at least one processor of a machine, cause the machine to perform operations comprising:
- causing presentation of a list of one or more ads to an operator on a display;
- receiving, via a computer input device, a manual operator selection of an ad from the list, the ad to be placed into a schedule;
- performing placement analysis comprising:
  - determining business conditions associated with the selected ad limiting the slots where the selected ad may be placed, the business conditions including at least one of day or range of dates of placement, time or time range of placement, networks for placement, placement inventory type, or an exclusivity requirement preventing two ads of a similar product type, manufacturer type, or supplier type from being positioned in proximity to each other;
  - determining filter preferences for the analysis, the filter preferences modifiable by the operator, the filter preferences specifying at least a minimum number of viable placement options each having a positive net difference metric value;
- accessing a current schedule;
- determining an absence of an empty slot in the current schedule that would satisfy the business conditions;
- based on the absence, performing a first step displacement analysis comprising identifying a plurality of placement options for placing the selected ad into the current schedule based on the selected ad, the business conditions, the filter preferences, and the current schedule, each placement option resulting in a modified schedule, each ad in the modified schedule having a metric value associated with its position in the schedule, the modified schedule having a net metric value equal to the sum of the metric values of all ads in the modified schedule, and determining a net difference metric value for each identified placement option as a difference between the net metric value for the modified schedule and the net metric value for the current schedule, each net difference metric value determined based on displacement of at least one previously scheduled ad in each identified placement option;
- for each placement option having a net difference metric value greater than a predetermined threshold, performing a next step displacement analysis comprising identifying a plurality of next step placement options for placing the displaced ad into the modified schedule based on the displaced ad, business conditions associated with the displaced ad, the filter preferences, and the modified schedule, each next step placement option resulting in a newly modified schedule having a net difference metric value that is a difference between the net metric value for the newly modified schedule and the net metric value for the modified schedule, the newly modified schedule's net difference metric value determined based on displacement of at least one other previously scheduled ad; and
- repeating the next step displacement analysis, each time displacing ads other than the operator-selected ad, until the filter preference minimum number of viable placement options is reached or until no further placement options having a net difference metric value greater than the predetermined threshold are obtained;
- sorting the plurality of placement options according to a score derived from the determined net difference metric values to create a result;
- causing presentation of the result to the operator on the display, the result including the score for each placement option;
- receiving an operator determination of which placement option in the presented result should be used; and
- repeating the operations for a plurality of advertisements.

18. The non-transitory machine-readable storage medium of claim 17, wherein the operations further comprise filtering the plurality of placement options to remove any placement options that have a negative net difference value metric.

19. The non-transitory machine-readable storage medium of claim 17, wherein the metric value associated with each ad's schedule position is selected from one of, or comprises a weighted combination of, a monetary value metric indicative of revenue that will be generated by the placement of the ad, a customer priority value metric indicative of the relative priority of the customer providing the ad as against other customers providing other ads in the schedule, and an ad order priority value metric indicative of the relative priority of the timeliness of presentation of the ad as against the timeliness of presentation of other ads in the schedule.

20. The non-transitory machine-readable storage medium of claim 17, wherein the receiving the selection of the ad from the list comprises receiving the selection of the ad and a slot where the ad is to be placed, and wherein the performing placement analysis comprises identifying a plurality of placement options for placing a displaced ad that is displaced by placement of the ad in the slot previously occupied by the displaced ad.

* * * * *